US011294945B2

(12) United States Patent
Kohita et al.

(10) Patent No.: US 11,294,945 B2
(45) Date of Patent: Apr. 5, 2022

(54) UNSUPERVISED TEXT SUMMARIZATION WITH REINFORCEMENT LEARNING

(71) Applicant: INTERNATIONAL BUSINESS MACHINES CORPORATION, Armonk, NY (US)

(72) Inventors: Ryosuke Kohita, Tokyo (JP); Akifumi Wachi, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 37 days.

(21) Appl. No.: 16/877,810

(22) Filed: May 19, 2020

(65) Prior Publication Data

US 2021/0365485 A1    Nov. 25, 2021

(51) Int. Cl.
*G06F 17/00* (2019.01)
*G06F 16/34* (2019.01)
(Continued)

(52) U.S. Cl.
CPC .......... *G06F 16/345* (2019.01); *G06F 40/284* (2020.01); *G06N 20/00* (2019.01)

(58) Field of Classification Search
CPC ..... G06F 16/345; G06F 40/284; G06N 20/00; G06N 3/04; G06N 3/08
(Continued)

(56) References Cited

U.S. PATENT DOCUMENTS 10,380,259 B2    8/2019  Lee et al.
10,474,709 B2    11/2019 Paulus
(Continued)

FOREIGN PATENT DOCUMENTS

CN    109271629 A    1/2019
CN    109635284 A    4/2019
(Continued)

OTHER PUBLICATIONS

Lee, G. et al. "Automatic text summarization using reinforcement learning with embedding features," Nov./-Dec. 2017, Proceedings of the 8th International Joint Conference on Natural Language Processing, pp. 193-197.*
(Continued)

*Primary Examiner* — Jason T Edwards
(74) *Attorney, Agent, or Firm* — Tutunjian & Bitetto, P.C.; Randall Bluestone (57) ABSTRACT

A computer-implemented method is presented for performing Q-learning with language model for unsupervised text summarization. The method includes mapping each word of a sentence into a vector by using word embedding via a deep learning natural language processing model, assigning each of the words to an action and operation status, determining, for each of the words whose operation status represents "unoperated," a status by calculating a local encoding and a global encoding, and concatenating the local encoding and the global encoding, the local encoding calculated based on a vector, an action, and an operation status of the word, and the global encoding calculated based on each of the local encodings of the words in a self-attention fashion, and determining, via an editorial agent, a Q-value for each of the words in terms of each of three actions based on the status.

25 Claims, 9 Drawing Sheets

(51) Int. Cl.
*G06N 20/00* (2019.01)
*G06F 40/284* (2020.01)

(58) Field of Classification Search
USPC .......................................................... 715/254
See application file for complete search history.

(56) References Cited

U.S. PATENT DOCUMENTS

| | | | | |
|---|---|---|---|---|
| 2013/0018659 | A1* | 1/2013 | Chi ........................ | G06F 3/167 |
| | | | | 704/275 |
| 2017/0004184 | A1* | 1/2017 | Jain ....................... | G06F 40/289 |
| 2018/0300400 | A1* | 10/2018 | Paulus ................... | G06F 40/58 |
| 2019/0205372 | A1 | 7/2019 | Li et al. | |
| 2019/0370338 | A1* | 12/2019 | Kong ..................... | G06F 16/345 |
| 2021/0103811 | A1* | 4/2021 | Kim ....................... | G06N 3/04 |

FOREIGN PATENT DOCUMENTS

| | | |
|---|---|---|
| CN | 109947931 A | 6/2019 |
| CN | 110781666 A | 2/2020 |
| WO | 2010080641 A1 | 7/2010 |

OTHER PUBLICATIONS

Wang, H. et al. "A self-attentive hierarchical model for jointly improving text summarization and sentiment classification," 2018, Proceedings of Machine Learning Research, pp. 630-640.*

Andrychowicz et al., "Hindsight Experience Replay", 31st Conference on Neural Information Processing Systems (NIPS 2017). Dec. 4-9, 2017. (pp. 1-11.).

Anonymous ACL Submission, "Q-learning with Language Model for Unsupervised Text Summarization", ACL 2019 Submission. (pp. 1-11.).

Fevry et al., "Unsupervised Sentence Compression using Denoising Auto-Encoders", Proceedings of the 22nd Conference on Computational Natural Language Learning (CoNLL 2018). Oct. 31-Nov. 1, 2018. (pp. 413-422.).

Lee et al., "Automatic Text Summarization Using Reinforcement Learning with Embedding Features", Proceedings of the 8th International Joint Conference on Natural Language Processing. Nov. 27-Dec. 1, 2017. (pp. 193-197.).

Mell et al., "The NIST Definition of Cloud Computing", NIST Special Publication 800-145 Sep. 2011. (pp. 1-7.).

International Search Report issued in corresponding PCT Application No. PCT/IB2021/054096 dated Aug. 24, 2021 (4 pgs).

Written Opinion issued in corresponding PCT Application No. PCT/IB2021/054096 dated Aug. 24, 2021 (4 pgs).

Eke et al., "The Significance of Global Vectors Representation in Sarcasm Analysis", 2020 International Conference in Mathematics, Computer Engineering and Computer Sciences, Apr. 2020, pp. 1-7.

Bhoir et al., "Comparative Analysis of Different Word Embedding Models", 2017 International Conference on Advances in Computing, Communication and Control, Mar. 2018, pp. 1-4.

* cited by examiner

UNSUPERVISED TEXT SUMMARIZATION WITH REINFORCEMENT LEARNING

BACKGROUND

The present invention relates generally to unsupervised text summarization, and more specifically, to unsupervised text summarization employing a Q-language approach with language model.

A vast amount of information exists in text form, such as free, unstructured, or semi-structured text, including many database fields, reports, memos, email, web sites, and news articles. This information can be of interest to a variety of individuals and entities, such as business managers, market analysts, researchers, private companies, public companies and government agencies. As a result, methods have been developed to analyze textual resources. Text analysis, or text data analysis, can involve such functions as document classification, document clustering, information visualization, text or document summarization, and document cross-referencing.

Text summarization refers to the technique of shortening long pieces of text. The intention is to create a coherent and fluent summary having only the main points outlined in the document. Automatic text summarization is a common problem in machine learning and natural language processing (NLP).

SUMMARY

In accordance with an embodiment, a method is provided for performing Q-learning with language model for unsupervised text summarization. The method includes mapping each word of a sentence into a vector by using word embedding via a deep learning natural language processing (NPL) model, assigning each of the words to an action and operation status, determining, for each of the words whose operation status represents "unoperated," a status by calculating a local encoding and a global encoding, and concatenating the local encoding and the global encoding, wherein the local encoding is calculated based on a vector, an action, and an operation status of the word, and the global encoding is calculated based on each of the local encodings of the words in a self-attention fashion, and determining, via an editorial agent, a Q-value for each of the words in terms of each of three actions based on the status.

In accordance with another embodiment, a system is provided for performing Q-learning with language model for unsupervised text summarization. The system includes a memory and one or more processors in communication with the memory configured to map each word of a sentence into a vector by using word embedding via a deep learning natural language processing (NPL) model, assign each of the words to an action and operation status, determine, for each of the words whose operation status represents "unoperated," a status by calculating a local encoding and a global encoding, and concatenate the local encoding and the global encoding, wherein the local encoding is calculated based on a vector, an action, and an operation status of the word, and the global encoding is calculated based on each of the local encodings of the words in a self-attention fashion, and determine, via an editorial agent, a Q-value for each of the words in terms of each of three actions based on the status.

In accordance with yet another embodiment, a non-transitory computer-readable storage medium comprising a computer-readable program for performing Q-learning with language model for unsupervised text summarization is presented. The non-transitory computer-readable storage medium performs the steps of mapping each word of a sentence into a vector by using word embedding via a deep learning natural language processing (NPL) model, assigning each of the words to an action and operation status, determining, for each of the words whose operation status represents "unoperated," a status by calculating a local encoding and a global encoding, and concatenating the local encoding and the global encoding, wherein the local encoding is calculated based on a vector, an action, and an operation status of the word, and the global encoding is calculated based on each of the local encodings of the words in a self-attention fashion, and determining, via an editorial agent, a Q-value for each of the words in terms of each of three actions based on the status.

In accordance with an embodiment, a method is provided for performing Q-learning with language model for unsupervised text summarization. The method includes mapping each word of a sentence into a vector by using word embedding via a deep learning natural language processing (NPL) model, assigning each of the words to an action and operation status, determining, for each of the words whose operation status represents "unoperated," a status by calculating a local encoding and a global encoding, wherein the local encoding and the global encoding are concatenated, and determining, via an editorial agent, a Q-value for each of the words based on edit operations "replace," "keep," and "remove."

In accordance with another embodiment, a system is provided for performing Q-learning with language model for unsupervised text summarization. The system includes a memory and one or more processors in communication with the memory configured to map each word of a sentence into a vector by using word embedding via a deep learning natural language processing (NPL) model, assign each of the words to an action and operation status, determine, for each of the words whose operation status represents "unoperated," a status by calculating a local encoding and a global encoding, wherein the local encoding and the global encoding are concatenated; and determine, via an editorial agent, a Q-value for each of the words based on edit operations "replace," "keep," and "remove."

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE DRAWINGS

The invention will provide details in the following description of preferred embodiments with reference to the following figures wherein.

Throughout the drawings, same or similar reference numerals represent the same or similar elements.

DETAILED DESCRIPTION

Embodiments in accordance with the present invention provide methods and devices for employing Q-learning with language model for unsupervised text summarization. Text summarization is a technique for generating a concise and precise summary of voluminous texts while focusing on the sections that convey useful information, and without losing the overall meaning. Automatic text summarization aims to transform lengthy documents into shortened versions, something which could be difficult and costly to undertake if done manually. Machine learning algorithms can be trained to comprehend documents and identify the sections that convey important facts and information before producing the summarized texts.

With huge amounts of data circulating in digital space, there is a need to develop machine learning algorithms that can automatically shorten longer texts and deliver accurate summaries that can pass the intended messages. Furthermore, applying text summarization reduces reading time, accelerates the process of researching for information, and increases the amount of information that can fit in an area. There are two main types of summarizing text in natural language processing (NLP), that is, extraction-based summarization and abstraction-based summarization. The extractive text summarization technique involves pulling key phrases from the source document and combining them to make a summary. The extraction is made according to the defined metric without making any changes to the texts. The abstraction technique entails paraphrasing and shortening parts of the source document. When abstraction is applied for text summarization in deep learning problems, abstraction can overcome the grammar inconsistencies of the extractive method. The abstractive text summarization algorithms create new phrases and sentences that relay the most useful information from the original text. The conventional approaches use two encoders-decoders, one set of encoders-decoders for compression learning and another set of encoders-decoders for reconstruction learning.

The exemplary embodiments of the present invention, in contrast, approach summarization as an editing process by employing a Q-learning approach with language model. The Q-learning approach employs two modules, that is, an editorial agent and a language model (LM) converter. The editorial agent determines an action for each word in a given sentence, whereas the LM converter deterministically conducts compression and reconstruction with the given actions. The editorial agent is trained to predict an appropriate action that leads to favorable compression and reconstruction by the LM converter. In the action prediction, the editorial agent leverages global language knowledge through a language model trained with a massive amount of data. Thus, Q-learning is applied to unsupervised text summarization. Q-learning is an off-policy reinforcement learning algorithm that seeks to find the best action to take given the current state. Q-learning is considered off-policy because the q-learning function learns from actions that are outside the current policy. More specifically, Q-learning seeks to learn a policy that maximizes a total reward.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Figure 1:
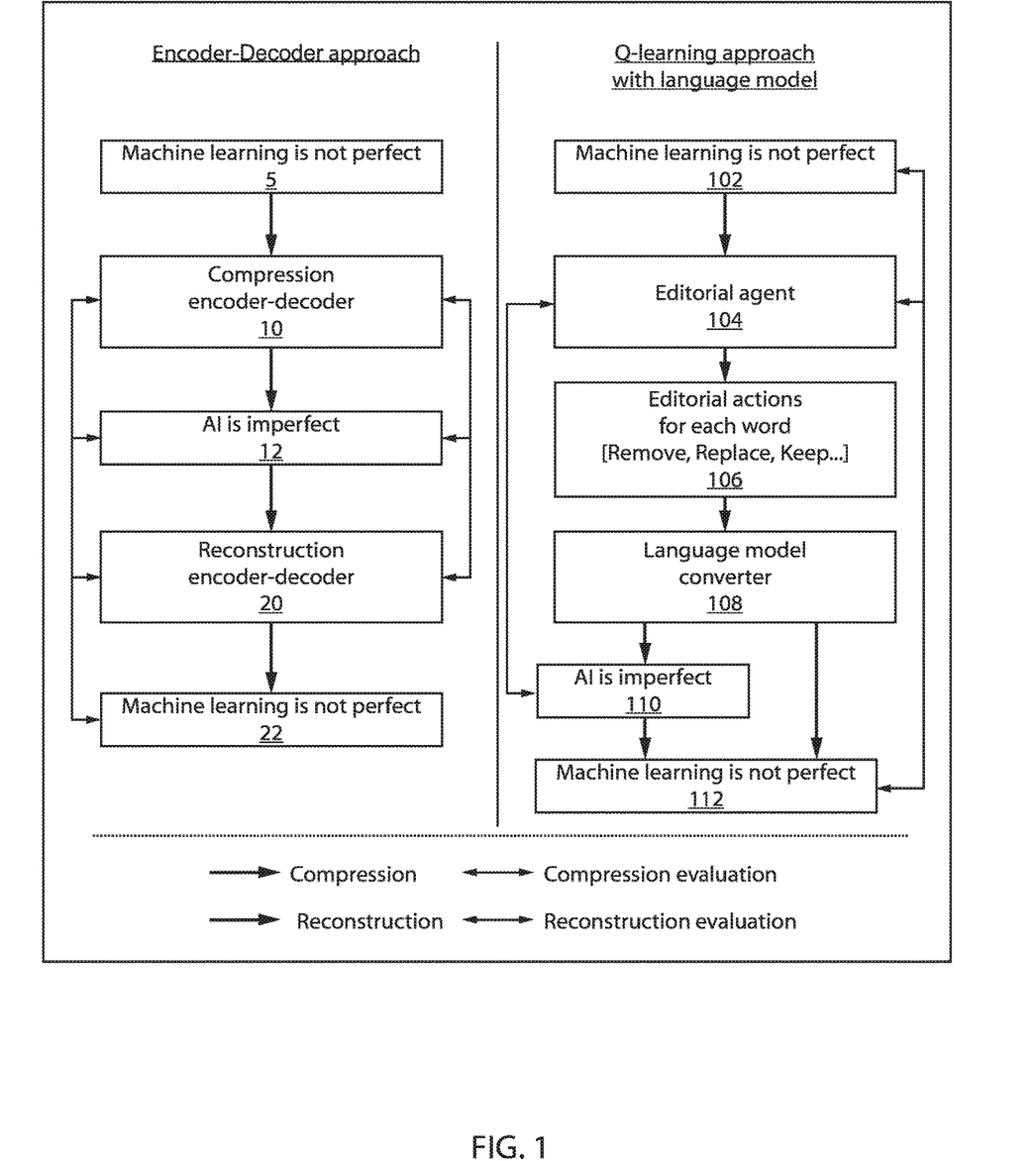
FIG. 1 is block/flow diagram illustrating the Q-learning approach with language model for unsupervised text summarization, in accordance with an embodiment of the present invention.

FIG. 1 is block/flow diagram illustrating the Q-learning approach with language model for unsupervised text summarization, in accordance with an embodiment of the present invention.

The block/flow diagram illustrates the conventional approach and the Q-learning approach with language model. In the conventional approach, a pair of encoders-decoders are employed. For example, the sentence "Machine learning is not perfect" 5 is fed into a compression encoder-decoder 10. The compression encoder-decoder 10 outputs the sentence 12, that is, "AI is imperfect." The output sentence 12 is provided to a reconstruction encoder-decoder 20. The reconstruction encoder-decoder 20 reconstructs the initial sentence 22, that is, "Machine learning is not perfect." Thus, the first encoder-decoder 10 is used for compression and the second encoder-decoder 20 is used for reconstruction.

In contrast, the Q-learning approach with language model provides the sentence 102, that is, "Machine learning is not perfect" and feeds it into an editorial agent 104. The editorial agent 104 determines an action 106 for each word. There are three actions 106. The three actions 106 are "remove," "replace," and "keep." Each word of sentence 102 with its respective editorial action 106 is fed into a language model (LM) converter 108. The LM converter 108 deterministically conducts compression and reconstruction with each given action. The outputs of the LM converter 108 are the sentence "AI is imperfect," (output 110) which is the compression transformation and the sentence "Machine learning is not perfect," (output 112) which is the reconstruction transformation.

Therefore, the Q-learning approach with language model handles summarization as an editing process, where each word is given one of three actions. The actions are "remove," "replace," and "keep." These actions can also be referred to as edit operations. Two modules are employed. The first module is the editorial agent 104 and the second module is the LM converter 108. The editorial agent 104 determines which action 106 to assign to each word of the sentence 102, whereas the LM converter 108 deterministically conducts compression and reconstruction with each given action. The compression is a transformation from an original sentence to a compressed sentence (e.g., a summary). The reconstruction is a transformation from the compressed sentence to the original sentence. The editorial agent 104 is trained to predict an appropriate action that leads to favorable compression and reconstruction by the LM converter 108. In the action prediction, the editorial agent 104 leverages global language knowledge through the language model 108 trained with a massive amount of data.

Broadly speaking, reinforcement learning differs from supervised learning in that correct input-output pairs are not presented but instead a machine (software agent) learns to take actions in some environment to maximize some form of reward or minimize a cost. Taking an action moves the environment/system from one state to another, and in the particular case of Q-learning, the "quality" of a state-action combination is calculated, this describing an action-value function which can be used to determine the expected utility of an action.

Q-learning is a model-free reinforcement learning algorithm for learning a policy telling an agent what action to take under what circumstances. Q-learning does not require a model (hence the connotation "model-free") of the environment, and Q-learning can handle problems with stochastic transitions and rewards, without requiring adaptations. For any finite Markov decision process (FMDP), Q-learning finds an optimal policy in the sense maximizing the expected value of the total reward over any and all successive steps, starting from the current state. Q-learning can identify an optimal action-selection policy for any given FMDP, given infinite exploration time and a partly-random policy. "Q" names the function that returns the reward used to provide the reinforcement and can be said to stand for the "quality" of an action taken in a given state.

Reinforcement learning involves an agent, a set of states, and a set of actions per state. By performing an action, the agent transitions from state to state. Executing an action in a specific state provides the agent with a reward (a numerical score). The goal of the agent is to maximize its total reward. The agent does this by adding the maximum reward attainable from future states to the reward for achieving its current state, effectively influencing the current action by the potential future reward. This potential reward is a weighted sum of the expected values of the rewards of all future steps starting from the current state. This will be further illustrated with reference to FIG. 2.

Figure 2:
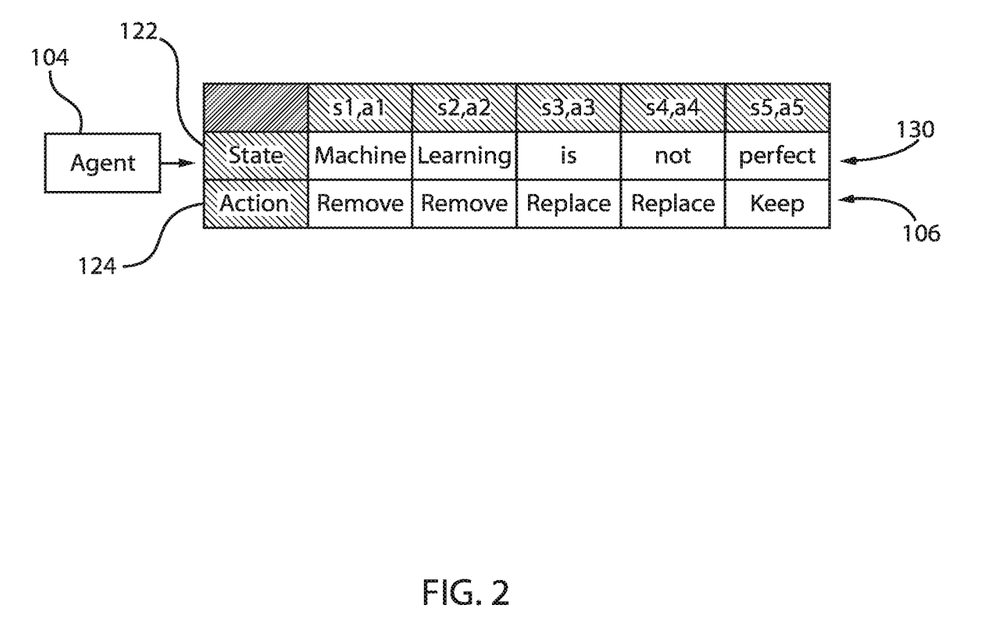
FIG. 2 is a table illustrating the states and actions of the Q-learning approach with language model for unsupervised text summarization, in accordance with an embodiment of the present invention.

FIG. 2 is a table illustrating the states and actions of the Q-learning approach with language model for unsupervised text summarization, in accordance with an embodiment of the present invention.

When q-learning is performed, a q-table or matrix is created that follows the shape of [state, action] and the values are initialized to zero. The q-values are then updated and stored after an episode. This q-table becomes a reference table for the agent to select the best action based on the q-value. The next step is simply for the agent to interact with the environment and make updates to the state action pairs in the q-table Q[state, action]. The agent uses the q-table as a reference and views all possible actions for a given state.

Figure 3:
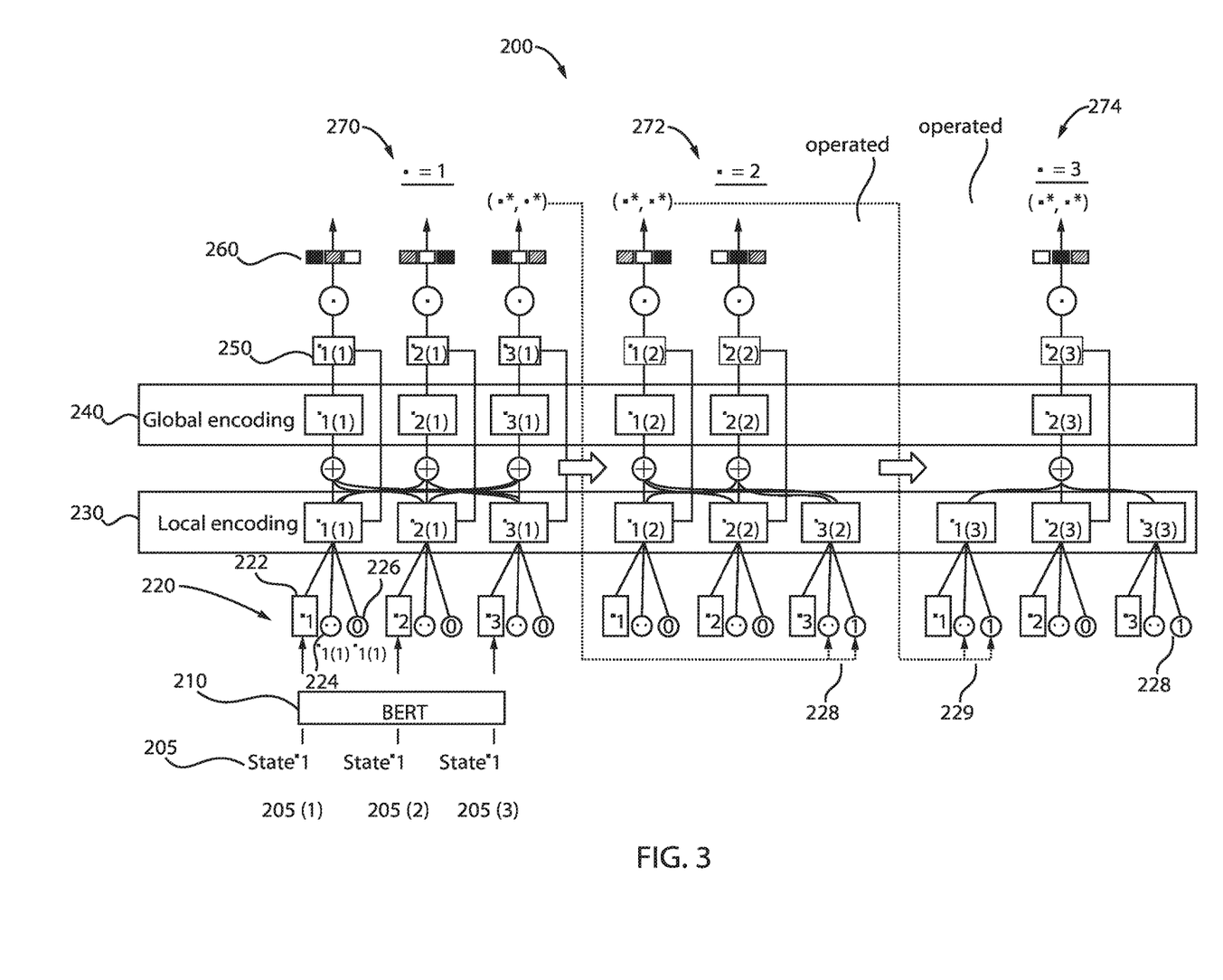
FIG. 3 is an exemplary system for iterative action prediction, in accordance with an embodiment of the present invention.

In particular, the editorial agent 104 makes a decision for each word in a sentence. In the instant case, the sentence 130 is "Machine learning is not perfect." This sentence 130 includes 5 words. A "state" 122 is a word in each sentence. An "action" 124 is one of three editorial operations 106, that is, an "action" 124 is "remove," "keep," or "replace." In one example, the agent 104 assigns the word "Machine" with the action "remove." The word "learning" can be assigned the action "remove." The word 'is" can be assigned the action "replace." The word "not" can be assigned the action "replace." The word "perfect" can be assigned the action "keep." The agent 104 makes the decision on all words of a sentence one by one. Thus, a one-by-one prediction takes place. The agent 104 decides the action of each word of a sentence. A summary is generated word by word. The question is, how does the agent 104 determine what action to give to each word in a sentence. FIG. 3 below outlines the methodology.

FIG. 3 is an exemplary system for iterative action prediction, in accordance with an embodiment of the present invention.

The iterative action predictive system 200 enables the editorial agent 104 to assign actions to each word of a sentence. States 205 are provided to a deep learning NPL model 210. For example, a first state 205(1), a second state 205(2), and a third state 205(3) are fed into the deep learning NPL model 210. Each state represents a word of a sentence. The deep learning NPL model 210 can be, e.g., a Bidirectional Encoder Representations from Transformers (BERT) 210 (deep learning NPL model by Google®). The BERT 210 outputs a vector 222, whereas an action 224 and an operation status 226 for each word 205 are determined by previous operations. In this first step, all the actions are initialized with "keep" and all operations are assigned "unoperated" status.

Local encoding 230 takes place and then global encoding 240 takes place. At 250, the local and global encodings are concatenated. Both local and global encodings 230, 240 are weighted sums of vectors. However, the local encoding 230 is different from the global encoding 240 based on what vectors are employed. In local encoding 230, feature vectors for a specific word are combined (BERT embedding, action, operation status). In global encoding 240, local encoding vectors for all of the words in a sentence are combined. Therefore, there are two vectors for each word (local vector and global vector). As noted, at 250, the local and global encodings are concatenated.

At 260, the highest Q-value is computed. The designation 270 indicates the first prediction, whereas designation 272 indicates the second prediction and designation 274 indicates the third prediction. In the first prediction 270, the third state 205(3) is processed.

Thereafter, in the second prediction 272, state 3 (205(3)) has been operated, and thus 228 indicates status "operated" for state 3. States 1 and 2 remain visible (as they are unoperated). In the third prediction 274, states 1 and 3 have been operated, and thus 229 indicates status "operated" for state 1. As a result, each state is processed during each stage or prediction phase. 228 and 229 thus indicate the updated predicted action and updated operation status. The predictions end when there are no more unoperated words. Stated differently, the predictions end when all words have the status "operated." Consequently, in accordance with the iterative action prediction system 200, an action sequence for a sentence can be produced for each time step, which enables compression and reconstruction for every time step.

Further, this allows the determination of which action makes the compression and reconstruction worse.

In the world of NLP, representing words or sentences in a vector form or word embedding opens up the gates to various potential applications. This functionality of encoding words into vectors is a powerful tool for NLP tasks such as calculating semantic similarity between words with which one can build a semantic search engine. For example, an application of word embedding with which Google understands search queries better is referred to as BERT. BERT is one of the most powerful language models that became popular among machine learning communities.

BERT (Bidirectional Encoder Representations from Transformers) models were pre-trained using a large corpus of sentences. In brief, the training is done by masking a few words (~15% of the words) in a sentence and tasking the model to predict the masked words. And as the model trains to predict, the model learns to produce a powerful internal representation of words as word embedding.

Embeddings are simply low dimensional representations of a point in a higher dimensional vector space. In the same manner, word embeddings are dense vector representations of words in lower dimensional space. The first word embedding model utilizing neural networks was published in 2013. Since then, word embeddings are encountered in almost every NLP model used in practice today. Of course, the reason for such mass adoption is their effectiveness. By translating a word to an embedding it becomes possible to model the semantic importance of a word in a numeric form and thus perform mathematical operations on it.

Figure 4:
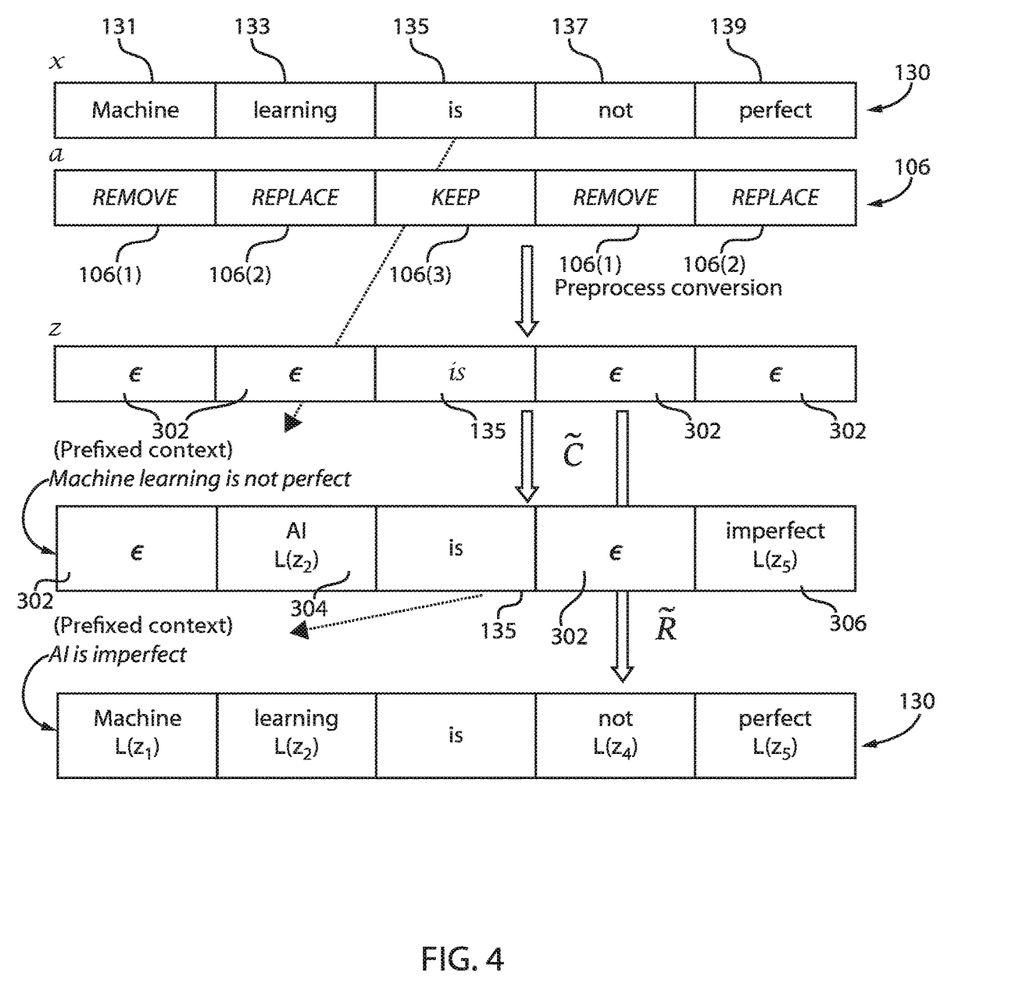
FIG. 4 is an exemplary mechanism for deterministic transformation by a language model converter, in accordance with an embodiment of the present invention.

FIG. 4 is an exemplary mechanism for deterministic transformation by a language model converter, in accordance with an embodiment of the present invention.

FIG. 4 illustrates how to produce compressed and reconstructed sentences by employing the LM converter. In particular, the sentence 130 is "Machine learning is not perfect." This sentence 130 includes 5 words. The first word 131 is "Machine," the second word 133 is "learning," the third word 135 is "is," the fourth word 137 is "not," and the fifth word 139 is "perfect." The editorial agent 104 selects an action 106 for each word 131, 133, 135, 137, 139 by employing the iterative action predictive system 200. The first word 131 has been assigned the action 106(1) or "remove," the second word 133 has been assigned the action 106(2) or "replace," the third word 135 has been assigned the action 106(3) or "keep," the fourth word 137 has been assigned the action 106(1) or "remove," and the fifth word 139 has been assigned the action 106(2) or "replace."

In the next step, a null token 302 (or ε) is assigned to actions "remove" and "replace." Thus, in the instant example 4 null tokens 302 have been assigned. The third word 135 remains intact. The next step is the compression phase. In the compression phase, the words "machine" and "learning" are compressed into "AI." As a result, the word "AI" or $L(z_2)$ 304 is inserted into the second block. Additionally, in the compression phase, the words "not" and "perfect" are compressed into "imperfect." As a result, the word "imperfect" or $L(z_5)$ 306 is inserted into the fifth block. Two null tokens 302 also remain. In the compression phase, the "remove" words are not predicted. Instead, in the compression phase, the "replace" words are predicted. In the reconstruction phase, the sentence 130 is reconstructed. Thus, the sentence "Machine learning is not perfect" is recovered. In the "remove" and "replace" slots, words are predicted to reconstruct the original sentence 130. Therefore, compression and reconstruction are operated deterministically by using the LM's ability to guess portions of sentences from fragments. As a result, there is no training for generation, which mitigates the issue of difficulty in co-training of multiple generators (as illustrated in the conventional approach; left-hand side of FIG. 1).

Figure 5:
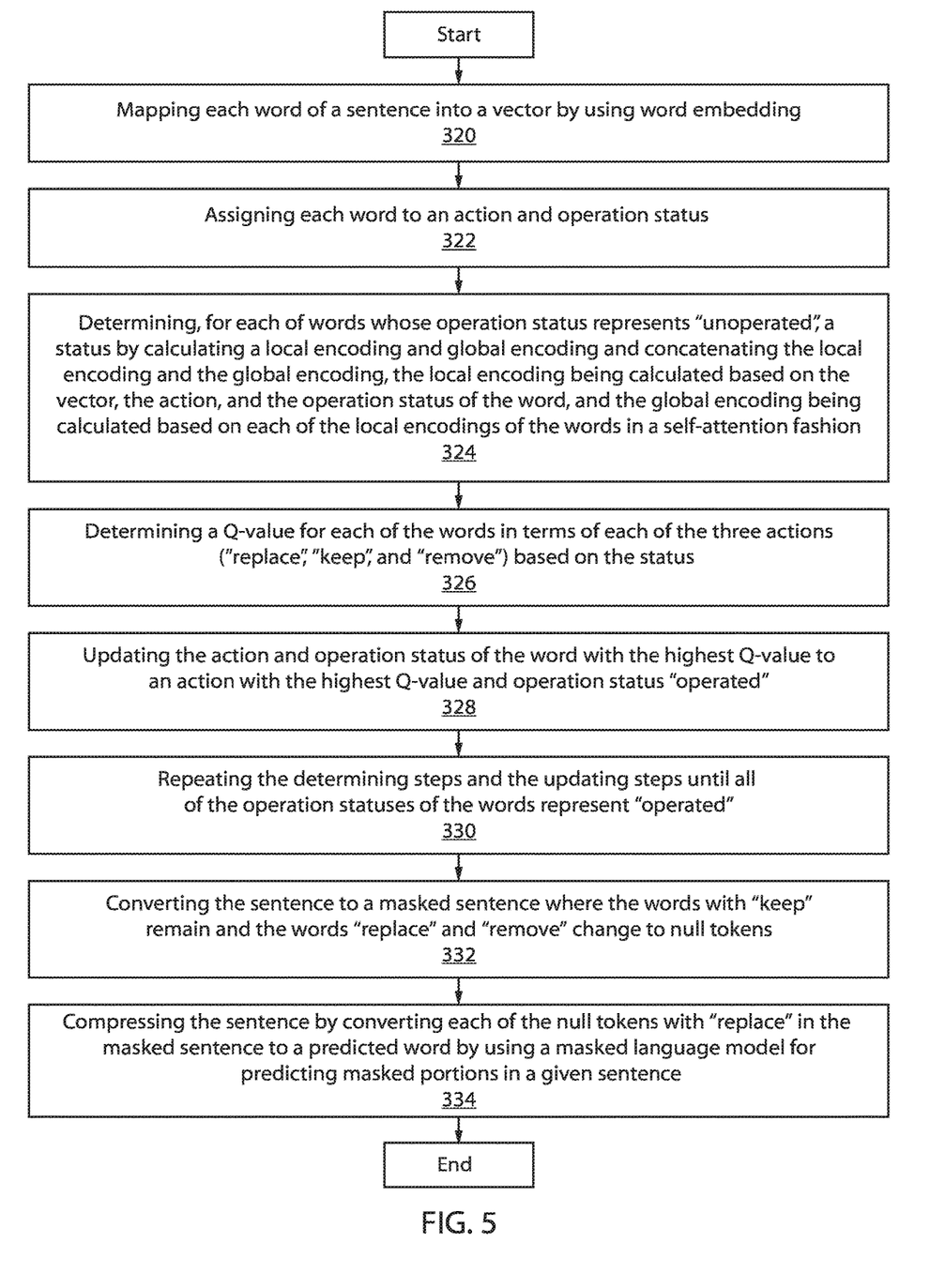
FIG. 5 is a block/flow diagram of an exemplary method for implementing the Q-learning approach with language model for unsupervised text summarization, in accordance with an embodiment of the present invention.

FIG. 5 is a block/flow diagram of an exemplary method for implementing the Q-learning approach with language model for unsupervised text summarization, in accordance with an embodiment of the present invention.

At block 320, map each word of a sentence into a vector by using word embedding.

At block 322, assign each word to an action and operation status.

At block 324, determine, for each of words whose operation status represents "unoperated," a status by calculating a local encoding and global encoding and concatenating the local encoding and the global encoding, the local encoding being calculated based on the vector, the action, and the operation status of the word, and the global encoding being calculated based on each of the local encodings of the words in a self-attention fashion.

In Self-Attention or K=V=Q, if the input is, for example, a sentence, then each word in the sentence needs to undergo Attention computation. The goal is to learn the dependencies between the words in the sentence and use that information to capture the internal structure of the sentence. Since self-attention is applied to both each word and all words together, no matter how distant they are, the longest possible path is one so that the system can capture distant dependency relationships.

At block 326, determine a Q-value for each of the words in terms of each of the three actions ("replace," "keep," and "remove") based on the status.

At block 328, update the action and operation status of the word with the highest Q-value to an action with the highest Q-value and operation status "operated."

At block 330, repeat the determining steps and the updating steps until all of the operation statuses of the words represent "operated."

At block 332, convert the sentence to a masked sentence where the words with "keep" remain and the words with "replace" and "remove" change to null tokens.

At block 334, compress the sentence by converting each of the null tokens with "replace" in the masked sentence to a predicted word by using a masked language model for predicting masked portions in a given sentence.

Figure 6:
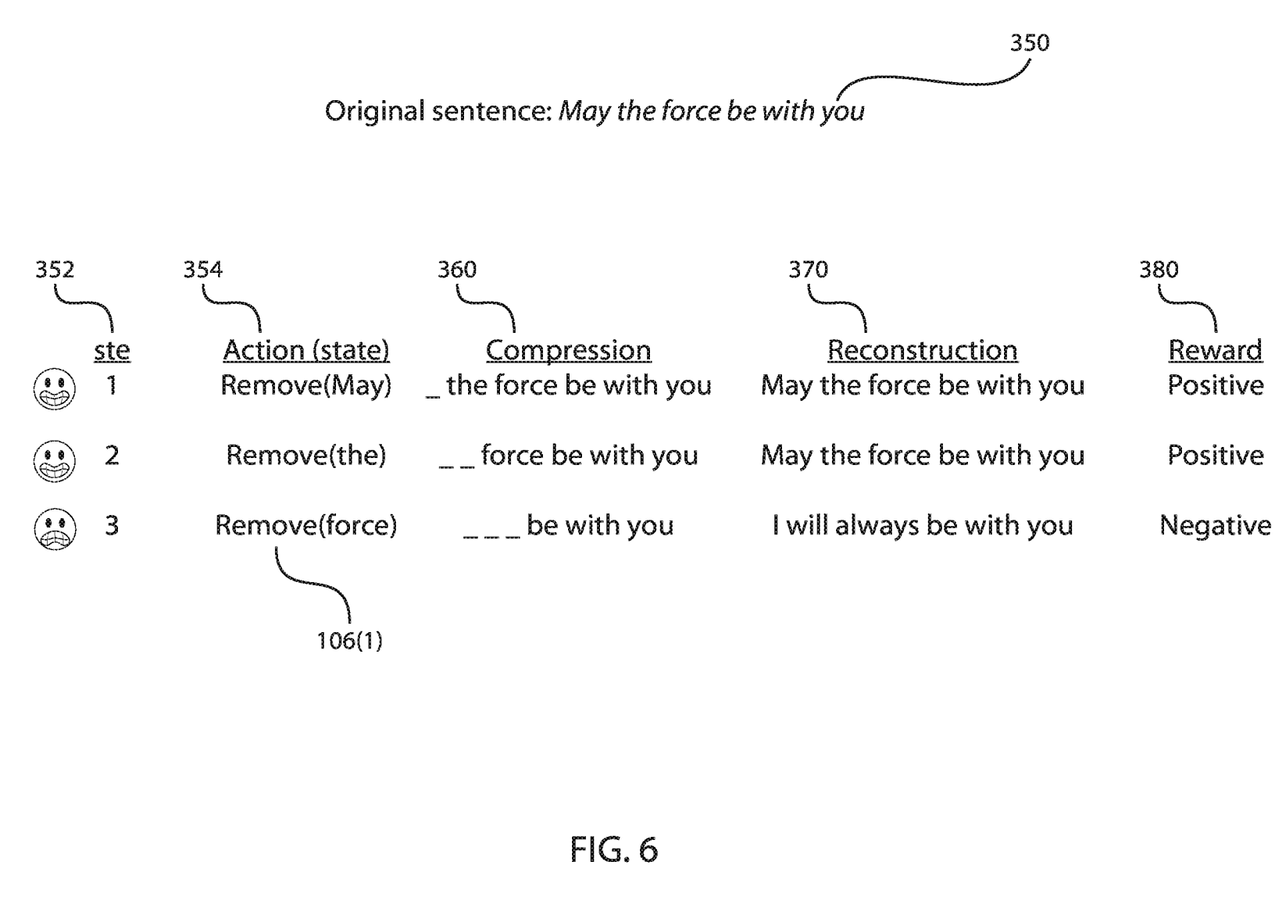
FIG. 6 is an example of computing a reward after conducting compression and reconstruction with actions sequences in every step, in accordance with embodiments of the present invention.

FIG. 6 is an example of computing a reward after conducting compression and reconstruction with actions sequences in every step, in accordance with embodiments of the present invention.

In FIG. 6, after compression and reconstruction are conducted with action sequences in every step, then a reward (e.g., value) of action is computed in each step from the change of generated sentences, which indicates what action with what situation is good or bad specifically. Conventional approaches calculate the reward only from the final output. This makes reward sparse and training of the agent more difficult. In contrast, in the present invention, there are no experiences after the agent gets a negative reward. For example, if the original sentence 350 is "May the force be with you," then different rewards can be assigned for different states.

In a first state 352, an action "remove" (354) can be given to the word "May." In the compression stage 360, the word "May" is removed. In the reconstruction phase 370, the original sentence 350 is reconstructed correctly. Thus, the reward 380 is a positive reward.

In a second state 352, an action "remove" (354) can be given to the word "May" and the word "the." In the compression stage 360, the words "May" and "the" are removed. In the reconstruction phase 370, the original sentence 350 is reconstructed correctly. Thus, the reward 380 is a positive reward.

In a third state 352, an action "remove" (354) can be given to the words "May," "the," and "force." In the compression stage 360, the words "May," "the," and "force" are removed. In the reconstruction phase 370, the original sentence 350 is not reconstructed correctly. The 3 missing words were reconstructed with "I will always," instead of "May the force." Thus, the reward 380 is a negative reward. This is a sequential reward design.

Figure 7:
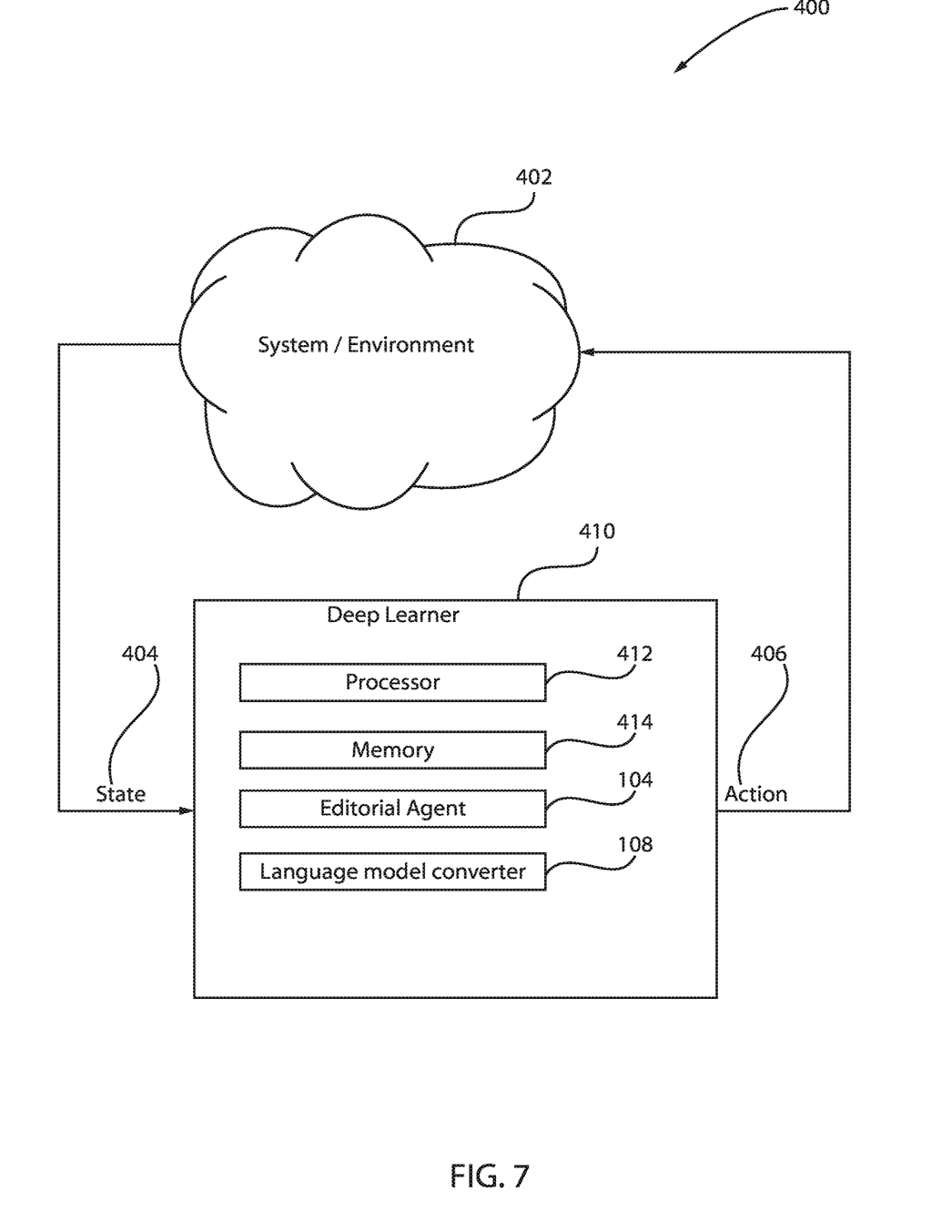
FIG. 7 is an exemplary processing system including an editorial agent and a language model converter, in accordance with embodiments of the present invention.

FIG. 7 is an exemplary processing system, in accordance with embodiments of the present invention.

Referring now to FIG. 7, a general purpose computer system 400 is programmed to implement corresponding functions to those illustrated in FIGS. 1, 3, and 4. The system includes a deep Q-learner 410 incorporating a processor 412, a memory 414, an editorial agent 104, and an LM converter 108. The memory 414 can store, e.g., neural network code, action select code, target Q generation code, and weight update code. The deep learner 410 receives states 404 from a system or neural network environment 402 and sends back actions 406 to the system or neural network environment 402.

Figure 8:
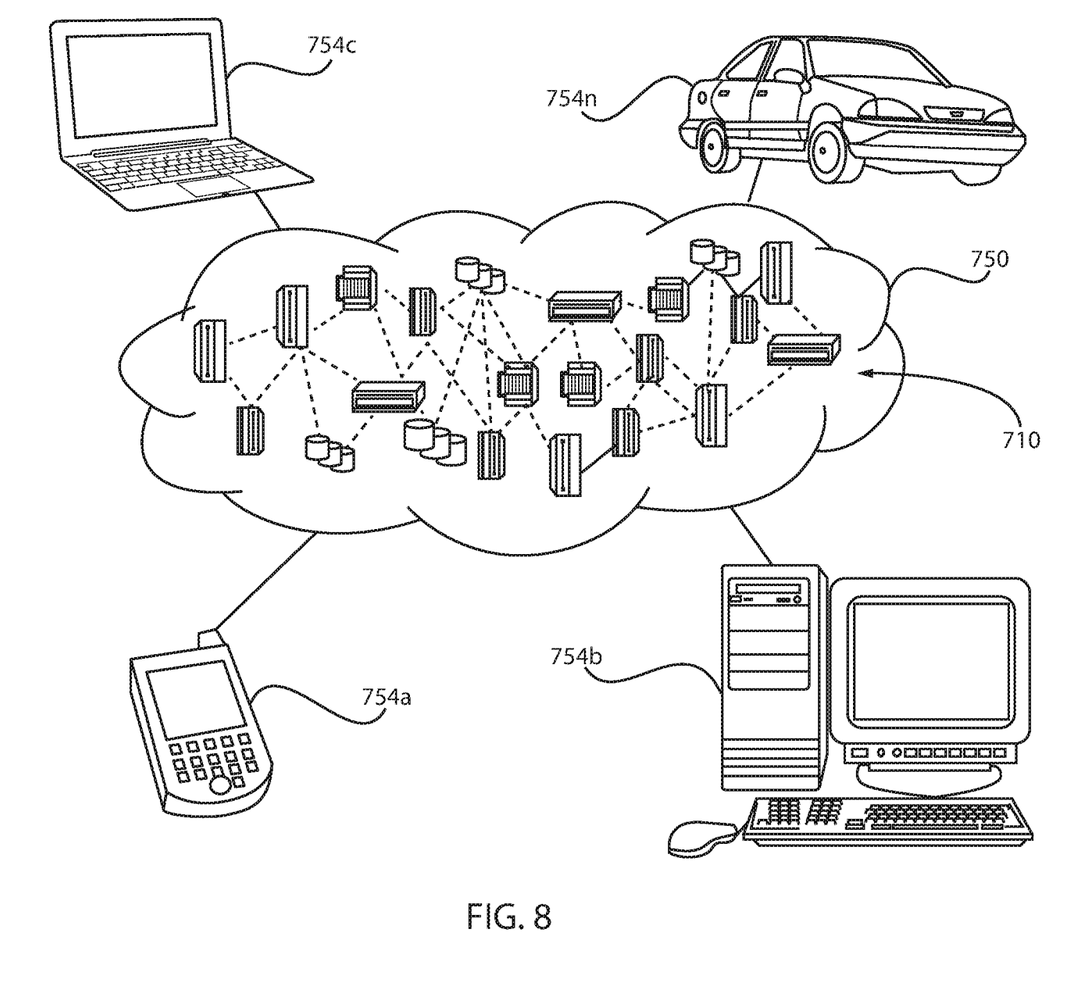
FIG. 8 is a block/flow diagram of an exemplary cloud computing environment, in accordance with an embodiment of the present invention.

FIG. 8 is a block/flow diagram of an exemplary cloud computing environment, in accordance with an embodiment of the present invention.

FIG. 8 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 8, illustrative cloud computing environment 750 is depicted for enabling use cases of the present invention. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N can communicate. Nodes 710 can communicate with one another. They can be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 8 are intended to be illustrative only and that computing nodes 710 and cloud computing environment 750 can communicate with any type of computerized device over any type of network and/or network addressable connection (e.g., using a web browser).

Figure 9:
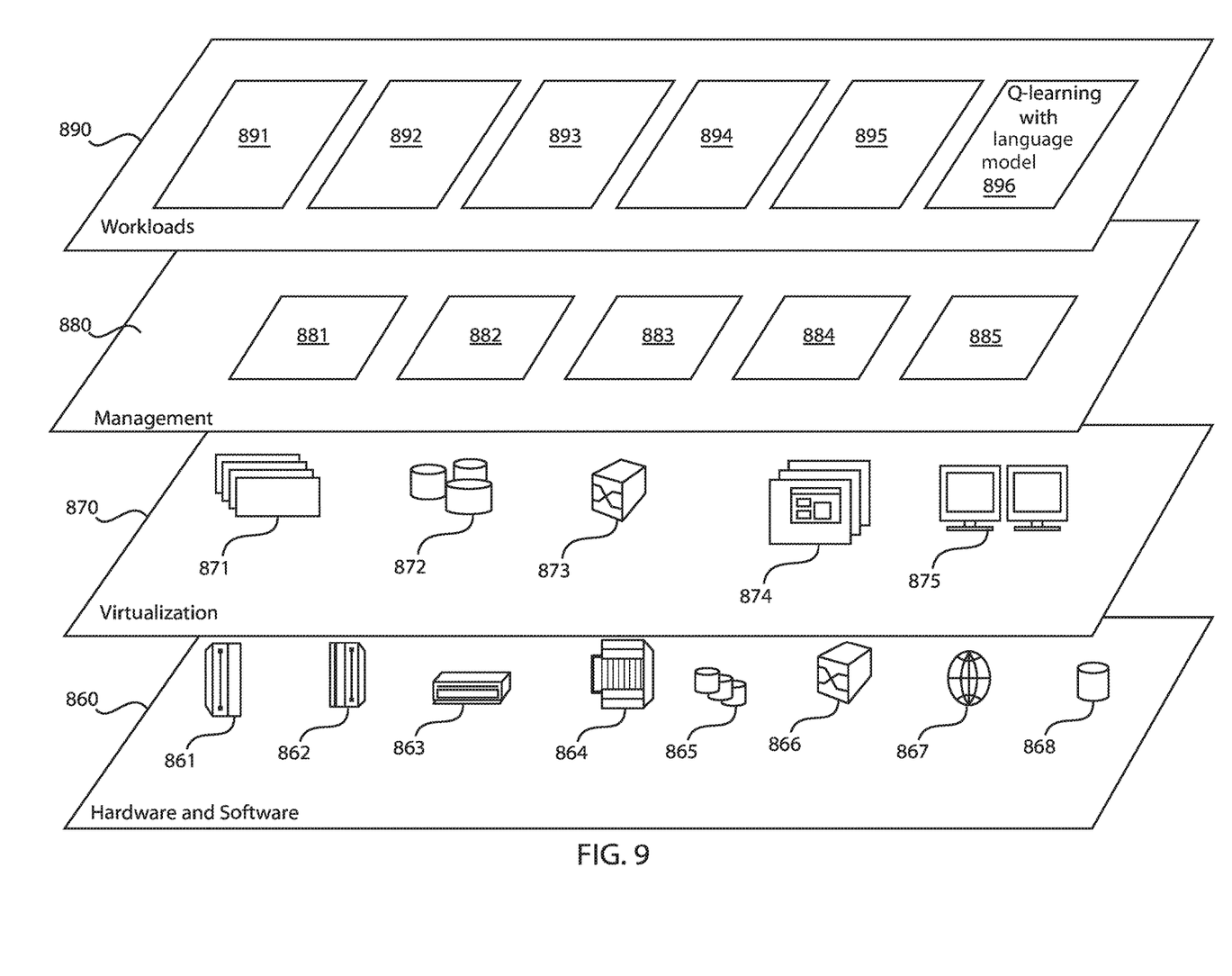
FIG. 9 is a schematic diagram of exemplary abstraction model layers, in accordance with an embodiment of the present invention.

FIG. 9 is a schematic diagram of exemplary abstraction model layers, in accordance with an embodiment of the present invention. It should be understood in advance that the components, layers, and functions shown in FIG. 9 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities can be provided: virtual servers 871; virtual storage 872; virtual networks 873, including virtual private networks; virtual applications and operating systems 874; and virtual clients 875.

In one example, management layer 880 can provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment can be utilized. Examples of workloads and functions which can be provided from this layer include: mapping and navigation 891; software development and lifecycle management 892; virtual classroom education delivery 893; data analytics processing 894; transaction processing 895; and a Q-learning with language model approach 896.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a system and method for unsupervised text summarization employing a Q-language approach with language model (which are intended to be illustrative and not limiting), it is noted that modifications and variations can be made by persons skilled in the art in light of the above teachings. It is therefore to be understood that changes can be made in the particular embodiments described which are within the scope of the invention as outlined by the appended claims.

Having thus described aspects of the invention, with the details and particularity required by the patent laws, what is claimed and desired protected by Letters Patent is set forth in the appended claims:

1. A computer-implemented method executed on a processor for performing Q-learning with language model for unsupervised text summarization, the method comprising:
   mapping each word of a sentence into a vector by using word embedding via a deep learning natural language processing (NPL) model;

assigning, via an editorial agent associated with Q-learning, each of the words of the sentence to an action and operation status one by one;

determining, for each of the words whose operation status represents "unoperated," a status by calculating a local encoding and a global encoding, and concatenating the local encoding and the global encoding, wherein the local encoding is calculated based on a vector, an action, and an operation status of the word, and the global encoding is calculated based on each of the local encodings of the words by employing self-attention; and determining a Q-value for each of the words in terms of each of three actions based on the status.

2. The method of claim 1, wherein the three actions are "replace," "keep," and "remove."

3. The method of claim 2, further comprising updating the action and the operation status of the word with the highest Q-value to an action with the highest Q-value and the operation status to "operated."

4. The method of claim 3, further comprising repeating the determining steps and the updating step until all of the operation statuses of the words represent "operated."

5. The method of claim 4, further comprising converting, via a language model converter, the sentence to a masked sentence where the words with "keep" remain and the words with "replace" and "remove" change to null tokens.

6. The method of claim 5, further comprising compressing the sentence by converting each of the null tokens with "replace" in the masked sentence to a predicted word by using a masked language model for predicting masked portions in a given sentence.

7. The method of claim 6, further comprising reconstructing the sentence from the compressed sentence by converting each of the null tokens in the masked sentence to a predicted word by employing the masked language model.

8. A non-transitory computer-readable storage medium comprising a computer-readable program executed on a processor in a data processing system for performing Q-learning with language model for unsupervised text summarization, wherein the computer-readable program when executed on the processor causes a computer to perform the steps of:

mapping each word of a sentence into a vector by using word embedding via a deep learning natural language processing (NPL) model;

assigning, via an editorial agent associated with Q-learning, each of the words of the sentence to an action and operation status one by one;

determining, for each of the words whose operation status represents "unoperated," a status by calculating a local encoding and a global encoding, and concatenating the local encoding and the global encoding, wherein the local encoding is calculated based on a vector, an action, and an operation status of the word, and the global encoding is calculated based on each of the local encodings of the words by employing self-attention; and determining a Q-value for each of the words in terms of each of three actions based on the status.

9. The non-transitory computer-readable storage medium of claim 8, wherein the three actions are "replace," "keep," and "remove."

10. The non-transitory computer-readable storage medium of claim 9, wherein the action and the operation status of the word with the highest Q-value are updated to an action with the highest Q-value and the operation status to "operated."

11. The non-transitory computer-readable storage medium of claim 10, wherein the determining steps and the updating step are repeated until all of the operation statuses of the words represent "operated."

12. The non-transitory computer-readable storage medium of claim 11, wherein the sentence is converted, via a language model converter, to a masked sentence where the words with "keep" remain and the words with "replace" and "remove" change to null tokens.

13. The non-transitory computer-readable storage medium of claim 12, wherein the sentence is compressed by converting each of the null tokens with "replace" in the masked sentence to a predicted word by using a masked language model for predicting masked portions in a given sentence.

14. The non-transitory computer-readable storage medium of claim 13, wherein the sentence is reconstructed from the compressed sentence by converting each of the null tokens in the masked sentence to a predicted word by employing the masked language model.

15. A system for performing Q-learning with language model for unsupervised text summarization, the system comprising:

a memory; and one or more processors in communication with the memory configured to:

map each word of a sentence into a vector by using word embedding via a deep learning natural language processing (NPL) model;

assign, via an editorial agent associated with Q-learning, each of the words of the sentence to an action and operation status one by one;

determine, for each of the words whose operation status represents "unoperated," a status by calculating a local encoding and a global encoding, and concatenate the local encoding and the global encoding, wherein the local encoding is calculated based on a vector, an action, and an operation status of the word, and the global encoding is calculated based on each of the local encodings of the words by employing self-attention; and determine a Q-value for each of the words in terms of each of three actions based on the status.

16. The system of claim 15, wherein the three actions are "replace," "keep," and "remove."

17. The system of claim 16, wherein the action and the operation status of the word with the highest Q-value are updated to an action with the highest Q-value and the operation status to "operated."

18. The system of claim 17, wherein the determining steps and the updating step are repeated until all of the operation statuses of the words represent "operated."

19. The system of claim 18, wherein the sentence is converted, via a language model converter, to a masked sentence where the words with "keep" remain and the words with "replace" and "remove" change to null tokens.

20. The system of claim 19, wherein the sentence is compressed by converting each of the null tokens with "replace" in the masked sentence to a predicted word by using a masked language model for predicting masked portions in a given sentence.

21. The system of claim 20, wherein the sentence is reconstructed from the compressed sentence by converting each of the null tokens in the masked sentence to a predicted word by employing the masked language model.

22. A computer-implemented method executed on a processor for performing Q-learning with language model for unsupervised text summarization, the method comprising:
- mapping each word of a sentence into a vector by using word embedding via a deep learning natural language processing model;
- assigning, via an editorial agent associated with Q-learning, each of the words of the sentence to an action and operation status one by one;
- determining, for each of the words whose operation status represents "unoperated," a status by calculating a local encoding and a global encoding, wherein the local encoding and the global encoding are concatenated; and
- determining a Q-value for each of the words based on edit operations "replace," "keep," and "remove."

23. The method of claim 22, wherein the local encoding is calculated based on a vector, an action, and an operation status of the word, and the global encoding is calculated based on each of the local encodings of the words by employing self-attention.

24. The method of claim 23,
wherein the sentence is converted, via a language model converter, to a masked sentence where the words with "keep" remain and the words with "replace" and "remove" change to null tokens; and
wherein the sentence is compressed by converting each of the null tokens with "replace" in the masked sentence to a predicted word by using a masked language model for predicting masked portions in a given sentence.

25. A system for performing Q-learning with language model for unsupervised text summarization, the system comprising:
- a memory; and
- one or more processors in communication with the memory configured to:
  - map each word of a sentence into a vector by using word embedding via a deep learning natural language processing model;
  - assign, via an editorial agent associated with Q-learning, each of the words of the sentence to an action and operation status one by one;
  - determine, for each of the words whose operation status represents "unoperated," a status by calculating a local encoding and a global encoding, wherein the local encoding and the global encoding are concatenated; and
  - determine, via an editorial agent, a Q-value for each of the words based on edit operations "replace," "keep," and "remove."

* * * * *